July 21, 1959 B. D. SMITH, JR 2,896,027
REFLEX AMPLIFIERS
Filed Oct. 19, 1953
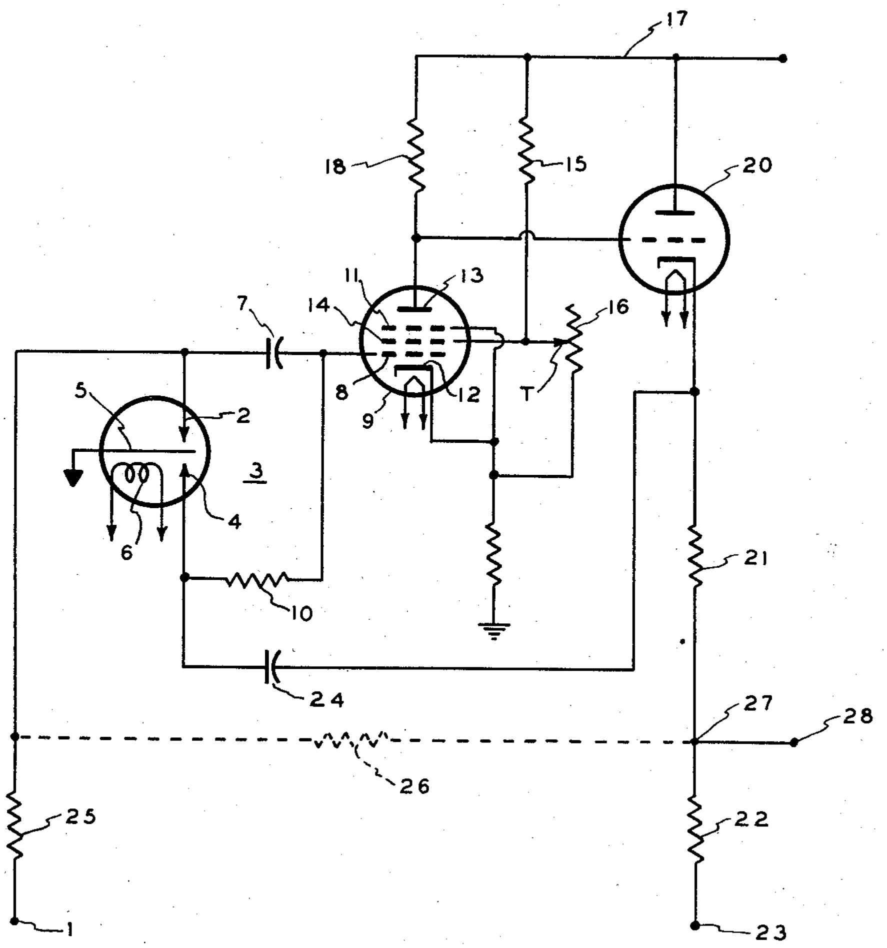
INVENTOR
BLANCHARD D. SMITH, JR.
BY Hyman Hurwitz
ATTORNEY United States Patent Office 2,896,027

Patented July 21, 1959

2,896,027

REFLEX AMPLIFIERS

Blanchard D. Smith, Jr., Alexandria, Va., assignor to Melpar, Inc., Alexandria, Va., a corporation of New York Application October 19, 1953, Serial No. 386,693

5 Claims. (Cl. 179—171)

The present invention relates generally to amplifying systems and more particularly to D.-C. chopper amplifiers of the reflex type.

Briefly describing the invention, a D.-C. signal to be amplified is interrupted by a mechanical chopper, or circuit maker and breaker, to form D.-C. pulses. The pulses are applied, via a coupling condenser, to the input circuit of an amplifier device, which amplifies the pulses to produce amplified output pulses. The amplified output pulses are reconverted to steady D.-C. by means of a rectifying circuit which includes the chopper, and the steady D.-C. is re-amplified by the amplifier device. The same amplifier device thus serves to amplify the pulses formed by the chopper, and to re-amplify the D.-C. output of the amplifier device, whereby unusually high amplification is attainable from a minimum number of amplifier stages. At the same time, a single chopper, or circuit maker and breaker is employed to interrupt the input D.-C. signal, and to rectify the output pulses for re-amplification as D.-C. signal.

If desired the D.-C. steady output of the amplifier may be fed back into the input of the amplifier device in degenerative phase, to linearize the response of the system.

It is, accordingly, an object of the present invention to provide a novel D.-C. chopper amplifier of the reflex type.

It is a more specific object of the invention to provide a novel D.-C. amplifier system, wherein the D.-C. input voltage to a D.-C. amplifier is periodically interrupted or chopped, the periodically interrupted or chopped voltage is amplified by the device, and the amplified voltage rectified by the device which performs the interruption, and applied as a steady D.-C. input to the amplifier device for further amplification therein.

It is a broader object of the present invention to provide a novel system of D.-C. amplification, wherein a D.-C. signal is periodically interrupted to form pulses, and wherein the pulses are amplified and converted to steady D.-C. voltage, and the latter re-amplified by the same amplifying device which amplifies the pulses.

The above and still further features, objects and advantages of the invention will become apparent upon consideration of the following detailed disclosure of a specific embodiment thereof, especially when taken in conjunction with the accompanying drawings, wherein the single figure is a schematic circuit diagram of a preferred amplifying system arranged in accordance with the invention.

Referring now more particularly to the accompanying drawings, the reference numeral 1 denotes an input terminal to which may be applied a D.-C. voltage, for amplification by the system of the present invention. The terminal 1 is connected to a first stationary contact 2, of a vibrating two position circuit maker and breaker 3, having a second stationary contact 4, and a vibrating grounded armature 5, actuated by means of a coil magnet 6. The latter is energized from a source of 60 c.p.s. voltage, and effects vibration of armature 5 at that frequency into contact with first and second contacts 2 and 4, in alternation. The circuit maker and breaker 3 is per se well known and conventional, being commonly called a chopper, and is commercially available. It is, therefore functionally illustrated and not described in detail.

The first stationary contact 2 is coupled via a coupling condenser 7 to the control grid 8 of a pentode amplifier 9. The second stationary contact 4 is connected to control grid 8 via a high resistance 10. Suitable values for condenser 7 and resistance 10 are, respectively, .25 mfd. and 8.2 megohms, so that the two circuit elements series have a time constant of slightly greater than two seconds. This value is not critical, it being essential merely that the time constant be long relative to the frequency of operation of the circuit maker and breaker 3.

The pentode 9 comprises a suppressor grid 11, a cathode 12, an anode 13 and a screen grid 14. The suppressor grid 11 is connected in conventional fashion directly to the cathode 12. The screen grid 14 is maintained at a relatively low voltage, supplied from a potentiometer consisting of a fixed resistance 15 and variable resistance 16, in series, between a source of B+ voltage 17 and the cathode 12. Resistance 15 may have a value of 50 K and resistance 16 a maximum value of 10 K which can be reduced by varying the position of variable tap T along the resistance 16. The screen grid 14 is connected to tap T and thereby is operated at relatively low screen voltage. This arrangement enables utilization of a relatively high plate load 18 for the pentode 9, and specifically a value of approximately ten (10) megohms.

The voltage available at the plate of the pentode 9 is applied by direct connection to the grid of a triode cathode follower tube 20, having its cathode connected in series with resistance 21, resistance 22, and a negative potential terminal 23, connected to a negative voltage substantially equal to the B+ voltage of the amplifier, say about −250 v.

The cathode of the triode 20 is coupled with the second contact 4 of the circuit maker and breaker 3, via a coupling condenser 24 of about .25 mfd.

The amplifier of the present invention may be operated with or without negative feedback. Provision for negative feedback includes resistance 25 in series between terminal 1 and contact 2, and of a resistance 26 intermediate (1) the junction 27, existing between series connected resistances 21 and 22, and (2) the contact 2. The output terminal 28, of the system, may be connected directly to terminal 27, so that a replica of this output voltage appears across resistance 25. The gain of the amplifier under these conditions is equal to the ratio of the magnitudes of resistances 26 and 25.

Describing now the operation of the present system, and assuming that a small D.-C. voltage is applied to the input terminal 1, the latter is grounded when armature 5 makes with contact 2, and otherwise ungrounded. Accordingly, the D.-C. input voltage, as it appears at contact 2, is an interrupted or chopped voltage, having value zero when armature 5 is in contact with terminal 2, and equal to the D.-C input when armature 5 is out of contact with terminal 2. The chopped voltage is coupled to the control grid 8 of pentode 9 via coupling condenser 7, and amplified by pentode 9. Accordingly, a phase reversed and amplified version of the chopped input voltage appears at the anode 13 of pentode 9, having maximum value when armature 5 makes contact with contact 2. The cathode follower triode 20 translates the voltage available at anode 13 to a relatively low impedance, consisting of resistances 21 and 22 in series, with no change in phase, and is transferred via coupling condenser 24 to contact 4. The voltage transferred is, then, an amplified replica of the chopped input voltage, but of reversed phase.

The potential, at contact 4, varies between ground, when armature 5 is in contact with contact 4, and an amplified positive or negative value, when out of contact. This amplified positive or negative value is reflected as a charge on condenser 7, accumulated when armature 5 is in contact with contact 2, and the time constant of the circuit including resistance 10 and condenser 7 is sufficiently great that condenser 7 substantially maintains its charge level during a relatively few operations of circuit maker and breaker 3. The voltage on the condenser 7 is in series with terminal 1 and control grid 8 of pentode 9. Accordingly, pentode 9 acts as an amplifier of steady D.-C., appearing across condenser 7, as well as of the chopped D.-C. deriving from input terminal 1. The condenser 24 serves to maintain the potential of contact 4, while armature 5 is out of contact therewith.

Output voltage may be derived from the load circuit of cathode follower tube 20. To assure that output will be zero when input is zero the cathode of cathode follower tube 20 is connected via its load resistances 21, 22, to a source of low voltage, and output tap 28 taken at an appropriate point along the resistances, i.e. at their junction. The values of the resistances are appropriately selected to establish the desired value of output voltage in response to zero input voltage.

The output voltage available at terminal 28 may be fed back to the input of the amplifier system by connecting resistance 26 from terminal 28 to contact 2, and resistance 25 in series between contact 2 and input terminal 1. Thereby, resistances 26, 25 form a voltage divider, applying a predetermined proportion of the output of the amplifier back in its input, in degenerative phase.

While I have described and illustrated one specific embodiment of my invention, it will be clear that variations of the general arrangement and of the details of construction which are specifically illustrated and described may be resorted to without departing from the true spirit and scope of the invention.

What I claim and desire to secure by Letters Patent of the United States is:

1. A D.-C. amplifier, comprising an input terminal for a D.-C. signal, means for interrupting said D.-C. signal periodically to produce periodic pulses having amplitudes proportional only to the amplitude of said D.-C. signal, an amplifying device having an input circuit and an output circuit, means comprising a condenser for applying said pulses to said input circuit, said condenser being connected in series between said input circuit and said input terminal, said amplifying device producing amplified replicas of said pulses in said output circuit, means comprising said means for interrupting for generating a D.-C. steady votlage representative in amplitude only of said replicas of said pulses, means for applying said D.-C. steady voltage to said input circuit, and said amplifying device generating an amplified replica only of said D.-C. steady voltage in said output circuit.

2. The combination in accordance with claim 1 wherein said amplifying device comprises a pentode vacuum tube having a plate load and a cathode follower tube having a cathode load, said output circuit including said cathode load and means for coupling said plate load with said cathode follower tube, said means for coupling consisting of a D.-C. connection.

3. A D.-C. reflex amplifier for a D.-C. signal, comprising means for periodically interrupting said D.-C. signal to produce pulses having amplitudes always equal to the amplitude of said D.-C. signal, an amplifier device having an input circuit and an output circuit, means comprising a coupling capacitor in series with said input circuit for applying said pulses to said input circuit for amplification by said amplifier device, whereby amplified pulses are produced by said amplifier device, means for converting said amplified pulses to a steady D.-C. voltage having an amplitude proportional to the amplitudes of said pulses, means for applying said steady D.-C. voltage in said input circuit for amplification by said amplifier device, and means for deriving amplified D.-C. voltage from said output circuit.

4. A D.-C. reflex amplifier, comprising an input terminal for a steady D.-C. signal to be amplified, means for periodically interrupting said D.-C. signal to produce periodic pulses having substantially the amplitude of said steady D.-C. signal, an amplifying device having an input circuit responsive to said periodic pulses and comprising at least a stage of amplification having high amplification and having a cathode follower output stage, said cathode follower output stage having a cathode load in which appear amplified versions of said periodic D.-C. pulses, means comprising said means for periodically interrupting for translating said amplified versions of said periodic pulses to steady D.-C. voltage in the input circuit of said amplifying device, the stages of said amplifying device being D.-C. coupled in cascade.

5. A D.-C. reflex amplifier, comprising an input terminal for a D.-C. signal, a circut maker and breaker having a vibrating armature and a first and second contact and means for actuating said vibrating armature into contact with said first and said second contacts in alteration, means connecting said armature to a point of reference potential, a two-terminal coupling capacitor, an amplifying device having a control electrode, means connecting one terminal of said condenser to said control electrode, means connecting the other terminal of said capacitor to said first contact and said input terminal, a high resistance having two terminals, means connecting one terminal of said high resistance to said control electrode, means for connecting the other terminal of said resistance to said second contact, said amplifying device having an output circuit and means for capacitively coupling said output circuit with said second contact.

References Cited in the file of this patent

UNITED STATES PATENTS

| | | |
|---|---|---|
| 2,497,129 | Liston | Feb. 14, 1950 |
| 2,597,029 | Phinney et al. | May 20, 1952 |
| 2,619,552 | Kerns | Nov. 25, 1952 |
| 2,709,205 | Colls | May 24, 1955 |
| 2,741,668 | Iffland | Apr. 10, 1956 |
| 2,744,969 | Peterson | May 8, 1956 |

FOREIGN PATENTS

| | | |
|---|---|---|
| 620,140 | Great Britain | Mar. 21, 1949 |